(12) United States Patent
Hamada et al.

(10) Patent No.: US 10,427,374 B2
(45) Date of Patent: Oct. 1, 2019

(54) SEAMLESS SPACER FABRICS FOR ELECTRONIC DEVICES

(71) Applicant: Apple Inc., Cupertino, CA (US)

(72) Inventors: Yohji Hamada, Wakayama (JP);
Siddhartha Hegde, San Jose, CA (US);
Zebinah P. Masse, San Jose, CA (US);
Rimple Bhatia, Woodside, CA (US);
Peter F. Coxeter, Sunnyvale, CA (US);
Amit S. Barve, Santa Clara, CA (US);
Donald L. Olmstead, Aptos, CA (US);
Javier Mendez, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/920,340

(22) Filed: Mar. 13, 2018

(65) Prior Publication Data

US 2018/0272644 A1 Sep. 27, 2018

Related U.S. Application Data

(60) Provisional application No. 62/474,320, filed on Mar. 21, 2017.

(51) Int. Cl.
*B32B 1/08* (2006.01)
*B32B 5/02* (2006.01)
(Continued)

(52) U.S. Cl.
CPC ............... *B32B 1/08* (2013.01); *B32B 3/266* (2013.01); *B32B 5/024* (2013.01); *B32B 5/026* (2013.01);
(Continued)

(58) Field of Classification Search
CPC ............... H04R 1/023; H04R 2201/02; H04R 2499/10; B32B 1/08; B32B 5/024;
(Continued)

(56) References Cited

U.S. PATENT DOCUMENTS

| 4,112,161 A | 9/1978 | Sorrells |
|---|---|---|
| 8,395,465 B2 | 3/2013 | Lauder et al. |

(Continued)

FOREIGN PATENT DOCUMENTS

| CN | 1325030 C | 7/2007 |
|---|---|---|
| CN | 103502002 A | 1/2014 |

(Continued)

*Primary Examiner* — Michael C Miggins
(74) *Attorney, Agent, or Firm* — Treyz Law Group, P.C.; Kendall W. Abbasi

(57) ABSTRACT

Electronic equipment may include seamless spacer fabric. Seamless spacer fabric may be used as a protective case or cosmetic cover for an electronic device such as a speaker. A seamless spacer fabric may include a seamless fabric outer layer, a spacer fabric inner layer, and an adhesive layer that bonds the seamless outer layer to the spacer fabric inner layer. The spacer fabric layer may have a seam region where one portion of the spacer fabric layer is joined with another portion of the fabric layer. The seamless fabric outer layer may cover the seam region to hide it from view. One or more additional seam hiding layers or strips may be formed on opposing sides of the spacer fabric layer to cover the seam. The seamless spacer fabric may have an array of openings that extends uniformly around the perimeter of the seamless spacer fabric.

20 Claims, 14 Drawing Sheets

(51) Int. Cl.
 *B32B 3/26* (2006.01)
 *B32B 27/12* (2006.01)
 *B32B 27/08* (2006.01)
 *B32B 5/26* (2006.01)
 *B32B 7/12* (2006.01)
 *B32B 7/03* (2019.01)
 *H04R 1/02* (2006.01)

(52) U.S. Cl.
 CPC ............... *B32B 5/26* (2013.01); *B32B 7/03* (2019.01); *B32B 7/12* (2013.01); *B32B 27/08* (2013.01); *B32B 27/12* (2013.01); *B32B 2250/20* (2013.01); *B32B 2262/02* (2013.01); *B32B 2262/0261* (2013.01); *B32B 2262/0292* (2013.01); *B32B 2262/103* (2013.01); *B32B 2457/00* (2013.01); *B32B 2571/00* (2013.01); *H04R 1/023* (2013.01); *H04R 2201/02* (2013.01); *H04R 2499/10* (2013.01)

(58) Field of Classification Search
 CPC ......... B32B 3/266; B32B 27/12; B32B 27/08; B32B 5/026; B32B 5/26; B32B 7/12; B32B 7/03; B32B 2457/00; B32B 2250/20; B32B 2262/02; B32B 2262/0261; B32B 2262/0292; B32B 2262/103; B32B 2571/00
 See application file for complete search history.

(56) References Cited

U.S. PATENT DOCUMENTS

| | | |
|---|---|---|
| 8,718,729 B1 | 5/2014 | Kershenstein |
| 9,894,789 B1 | 2/2018 | Hamada et al. |
| 2003/0114782 A1 | 6/2003 | Chiang et al. |
| 2013/0043778 A1 | 2/2013 | Bennett, Jr. |
| 2014/0043748 A1 | 2/2014 | Sartee et al. |
| 2015/0365758 A1 | 12/2015 | Bridge |

FOREIGN PATENT DOCUMENTS

| | | |
|---|---|---|
| CN | 203840483 U | 9/2014 |
| CN | 105307068 A | 2/2016 |
| CN | 205946080 U | 2/2017 |
| EP | 1576899 A1 | 9/2005 |
| EP | 1992400 A1 | 11/2008 |
| JP | 2004230165 A | 8/2004 |
| WO | 2012135529 A1 | 10/2012 |

SEAMLESS SPACER FABRICS FOR ELECTRONIC DEVICES

This application claims the benefit of provisional patent application No. 62/474,320, filed Mar. 21, 2017, which is hereby incorporated by reference herein in its entirety.

FIELD

This relates generally to fabric-based items, and, more particularly, to fabric-based items with seamless spacer fabrics.

BACKGROUND

Items are sometimes formed using fabric. For example, an electronic device may have portions formed from fabric or may be covered with a fabric case.

It can be challenging to form fabric items with the desired look, feel, and functionality. Spacer fabrics are sometimes used for their softness, durability, and breathability, but spacer fabrics are often joined with an unsightly seam that users may find aesthetically unappealing. Seamless fabrics provide a uniform appearance, but generally do not offer the same protection or cushiony feel of spacer fabrics.

It would therefore be desirable to be able to provide improved fabric items.

SUMMARY

Electronic equipment may include seamless spacer fabric. Seamless spacer fabric may be used as a protective case or cosmetic cover for an electronic device such as a speaker, may be used to form a band that holds an electronic device against a user's body, or may be used for other types of electronic equipment.

A fabric cover formed with seamless spacer fabric may include a seamless outer layer, a spacer fabric interior layer, and an adhesive layer that bonds the seamless outer layer to the spacer fabric interior layer. The seamless outer layer may be a single-layer tube of fabric. The spacer fabric interior layer may include first and second fabric layers joined by a spacer layer. The seamless outer layer may provide the fabric cover with a uniform appearance, whereas the spacer fabric may provide the fabric cover with a soft, cushiony feel that also helps protect the electronic device from damage by absorbing mechanical stress.

The fabric cover may have an array of openings that extend uniformly around the perimeter of the fabric cover. The openings may extend through the seamless outer layer, the adhesive layer, and the spacer fabric interior layer. The openings may have a diamond shape or other suitable shape.

The spacer fabric layer may have a seam region where one portion of the spacer fabric is fused or otherwise joined with another portion of the spacer fabric. The outer seamless layer may cover the seam region of the spacer fabric layer to hide the seam region from view.

One or more seam hiding strips of fabric may be placed on opposing sides of the seam region to help obscure the seam region from view.

DETAILED DESCRIPTION

Figure 1:
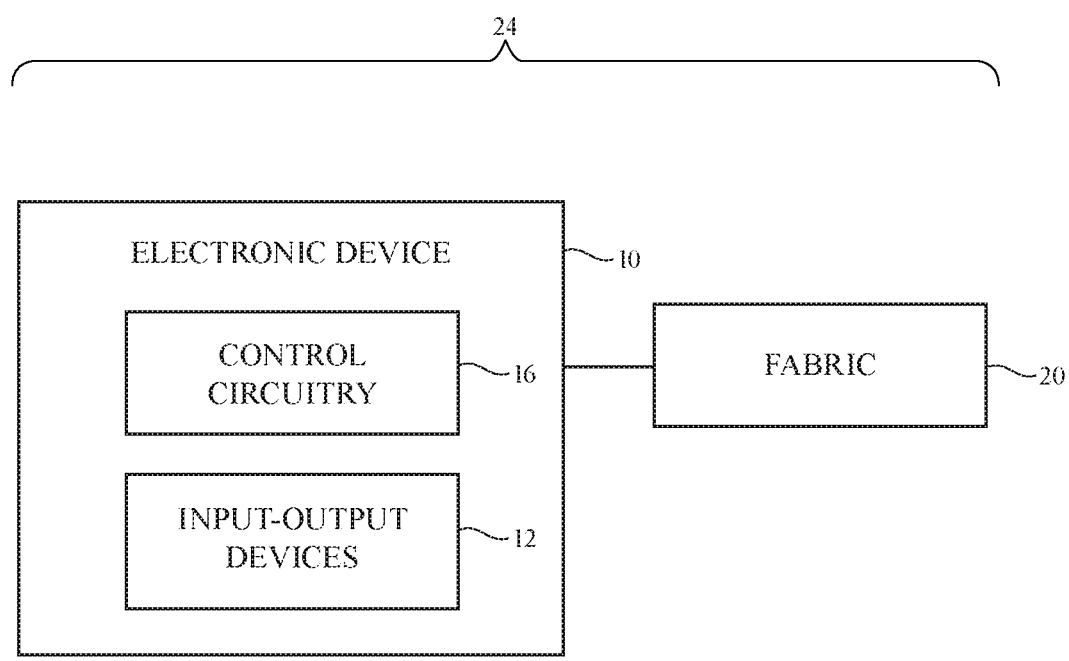
FIG. 1 is a schematic diagram of illustrative electronic equipment with fabric in accordance with an embodiment.

A schematic diagram of illustrative electronic equipment that may include one or more seamless fabric layers is shown in FIG. 1. Electronic equipment 24 of FIG. 1 may include an electronic device such as electronic device 10 and fabric such as fabric 20. Electronic device 10 and fabric 20 may be integral with one another, may be detachable or non-detachable from one another, and/or may be physically separate from one another while maintaining the ability to communicate with each other.

In one illustrative arrangement, fabric 20 in equipment 24 may be an accessory for electronic device 10. For example, fabric 20 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating, may be part of an item of clothing, or may be any other suitable fabric-based item. If desired, fabric 20 may be used in forming part of an electronic device such as a laptop computer, a computer monitor containing an embedded computer, a tablet computer, a cellular telephone, a speaker, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which fabric-based equipment is mounted in a kiosk, in an automobile or other vehicle, equipment that implements the functionality of two or more of these devices, or other electronic equipment.

Fabric 20 may form all or part of electronic device 10, may form all or part of a housing wall for electronic device 10, may form internal structures in electronic device 10, may cover one or more openings, recesses, or ports in electronic device 10, or may form other fabric-based structures. Electronic equipment 24 may be soft (e.g., may have a fabric surface that yields to a light touch), may have a rigid feel (e.g., may be formed form a stiff fabric), may be coarse, may be smooth, may have ribs or other patterned textures, and/or may be formed as part of a device that has portions formed from non-fabric structures of plastic, metal, glass, crystalline materials, ceramics, or other materials.

As shown in FIG. 1, electronic device 10 may include control circuitry 16. Control circuitry 16 may include storage and processing circuitry for controlling the operation of device 10. Control circuitry 16 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 16 may include processing circuitry based on one or more microprocessors, microcontrollers, digital signal processors, baseband processors, power management units, audio codec chips, application specific integrated circuits, etc.

Input-output devices 12 may be used to allow data to be supplied to device 10 and to allow data to be provided from device 10 to external devices. Input-output devices 12 may also include input-output components with which a user can control the operation of device 10. A user may, for example, supply commands through input-output devices 12 and may receive status information and other output from device 10 using the output resources of input-output devices 12.

Input-output devices 12 may include sensors and status indicators such as an ambient light sensor, a proximity sensor, a temperature sensor, a pressure sensor, a magnetic sensor, an accelerometer, a touch sensor, a fingerprint sensor, and light-emitting diodes and other components for gathering information about the environment in which device 10 is operating and providing information to a user of device 10 about the status of device 10. Audio components in devices 12 may include speakers and tone generators for presenting sound to a user of device 10 and microphones for gathering user audio input. Devices 12 may include one or more displays. Displays may be used to present images for a user such as text, video, and still images. Sensors in devices 12 may include a touch sensor array that is formed as one of the layers in a display. During operation, user input may be gathered using buttons and other input-output components in devices 12 such as touch pad sensors, buttons, joysticks, click wheels, scrolling wheels, touch sensors such as a touch sensor array in a touch screen display or a touch pad, key pads, keyboards, vibrators, cameras, and other input-output components. The input-output devices of device 10 may include wired and wireless communications circuitry (e.g., circuitry to support digital data communications, a radio-frequency transceiver and antennas for supporting wireless communications, etc.).

Control circuitry 16 may be used to run software on device 10 such as operating system code and applications. During operation of equipment 24, the software running on control circuitry 16 may display images for a user on a display and/or may use other devices within input-output devices 12. For example, the software running on control circuitry 16 may be used to process input from a user using one or more sensors (e.g., capacitive touch sensors, mechanical sensors, thermal sensors, force sensors, switches, buttons, touch screen displays, and other components) and may be used to provide status indicator output and other visual and/or audio output.

Fabric 20 may be formed from intertwined strands of material. Fabric 20 may include one or more layers of woven fabric, knit fabric, warp knit fabric, flat knit fabric, circular knit fabric, and/or fabric that has been formed using other intertwining techniques. Fabric 20 may be a multi-layer fabric in which multiple fabric layers are joined (e.g., using an adhesive layer, using a fusible fabric layer, using strands of material that are intertwined to hold the multiple fabric layers together, and/or using other techniques). Fabric 20 may, for example, include a spacer fabric inner layer (e.g., a fabric having two or more layers separated by a soft and cushiony spacer layer), a seamless fabric outer layer, and an adhesive layer joining the spacer fabric inner layer and the seamless fabric outer layer. The seamless outer layer may provide the fabric with a uniform appearance, whereas the spacer fabric may provide a soft, cushiony feel that also helps protect device 10 from damage by absorbing mechanical stress. This is merely illustrative, however. In general, any suitable combination of fabrics and other materials may be used to form fabric 20.

The strands of material that form fabric 20 may be monofilaments, may be multifilament strands (sometimes referred to herein as yarns or threads), may be formed from metal (e.g., metal monofilaments and/or yarns formed from multiple monofilament wires), may be formed from dielectric (e.g., polymer monofilaments and yarns formed from multiple polymer monofilaments), may be formed from fusible material such as thermosetting polymer material (e.g., thermosetting polyester, polyurethane, polyimide, or other thermosetting resin), thermoplastic material (e.g., thermoplastic polyester, nylon or other suitable polyamide, thermoplastic polyurethane, etc.), or other fusible material that becomes soft when heated to an appropriate temperature (e.g., between 60° C. and 140° C., between 60° C. and 160° C., 80° C. and 100° C., less than 180° C., etc.), may include dielectric cores covered with conductive coatings such as metal (e.g., metal coated dielectric monofilaments and yarns of metal coated polymer-core monofilaments may be used to form conductive monofilaments and conductive yarns, respectively), may include outer insulating coatings (e.g., coatings of polymers or other dielectrics may surround each metal-clad polymer monofilament or each collection of metal-clad polymer monofilaments in a yarn, polymer insulation may enclose a multifilament metal wire, etc.), or may be other suitable strands of material for forming fabric.

Figure 2:
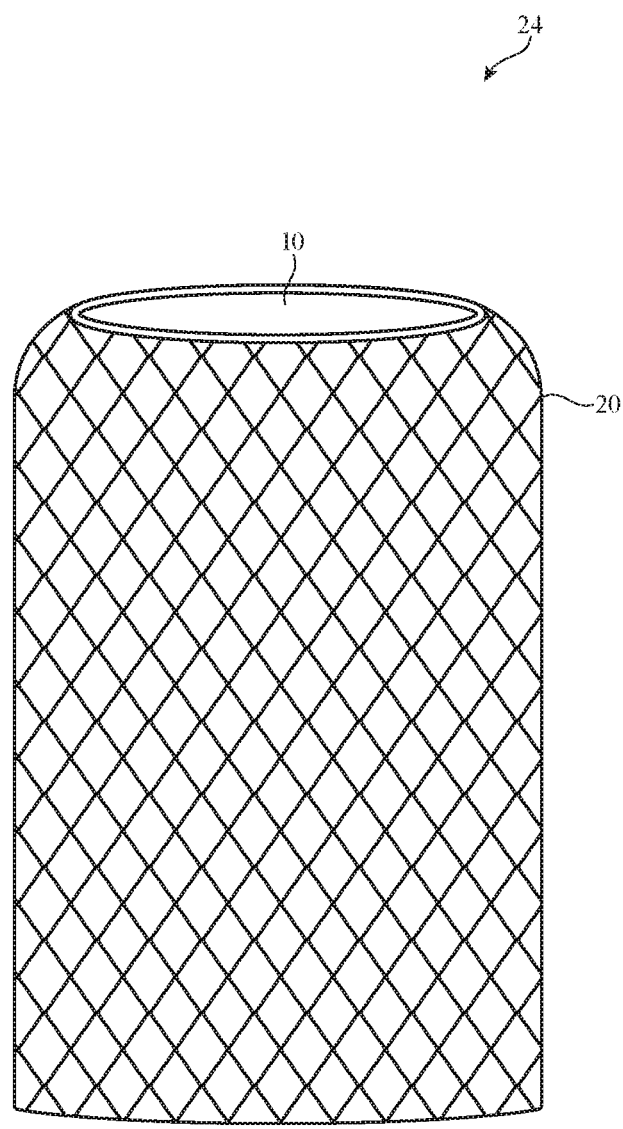
FIG. 2 is a perspective view of illustrative electronic equipment including an electronic device and a fabric cover for the electronic device in accordance with an embodiment.

A perspective view of illustrative electronic equipment 24 in which fabric 20 forms a removable cover or sleeve for electronic device 10 is shown in FIG. 2. In the example of FIG. 2, electronic device 10 has a cylindrical housing, and fabric 20 has a matching tube-like shape that conforms to the outer surface of electronic device 10 when fabric 20 is placed on electronic device 10. Electronic device 10 may, for example, be a speaker device such as portable speakers or other suitable speaker device. This is, however, merely illustrative. In general, electronic device 10 may be any suitable type of electronic device having any suitable exterior shape (e.g., conical shapes, pyramidal shapes with curved and/or planar sidewall surfaces, spherical housing shapes, other shapes, a combination of these shapes, etc.), and fabric 20 may have a corresponding shape to form a cover or case for electronic device 10.

Figure 3:
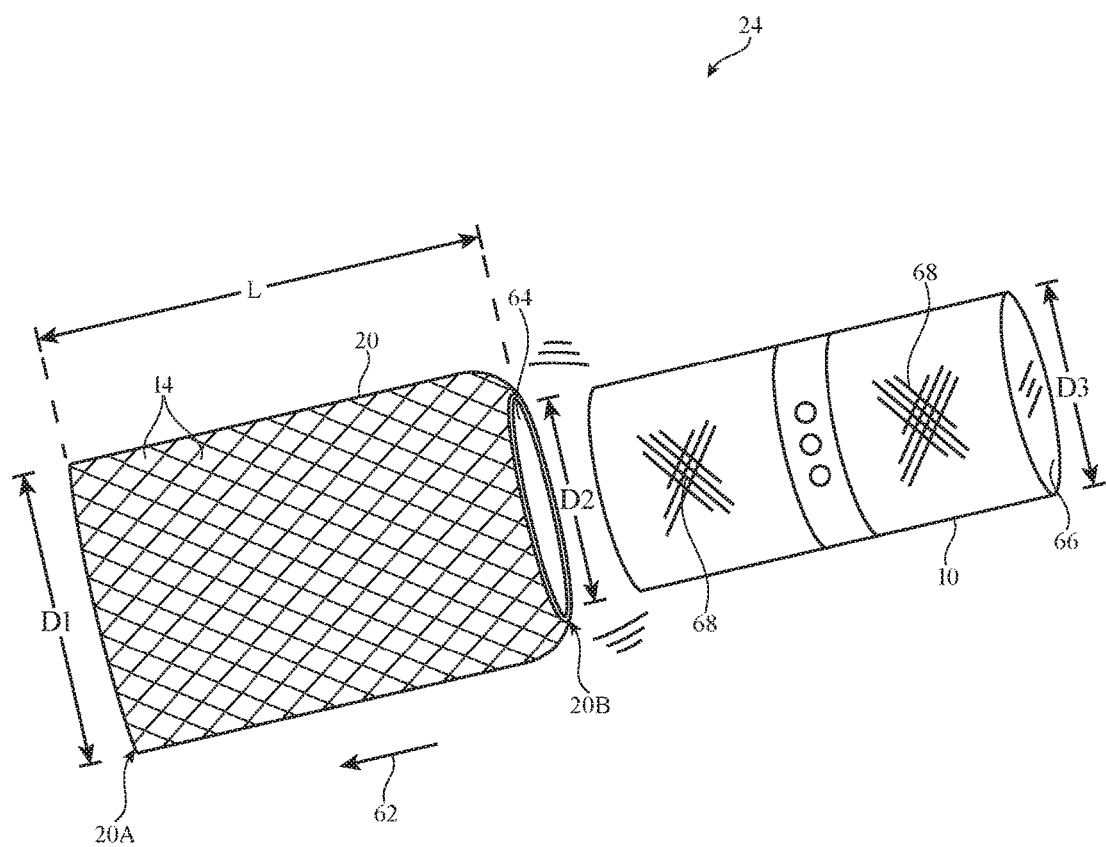
FIG. 3 is a perspective view of the electronic equipment of FIG. 2 showing how a fabric cover may be removed from an electronic device in accordance with an embodiment.

FIG. 3 is a perspective view of the electronic equipment of FIG. 2 showing how fabric cover 20 may be removed from electronic device 10 (e.g., by pulling cover 20 in direction 62). Fabric cover 20 may, for example, be formed from structured fabric that holds its shape even when removed from electronic device 10. As shown in FIG. 3, for example, fabric cover 20 maintains a cylindrical shape even when removed from the cylindrical body of electronic device 10.

FIG. 3 shows how fabric cover 20 may have a central opening 64 that receives device 10. Opening 64 may have a uniform diameter along the length L of cover 20, or opening 64 may have different diameters at different locations along length L. As shown FIG. 3, for example, opening 64 of cover 20 may have a first diameter D1 at a first end (end 20A) of cover 20 and a second diameter D2 at a second opposing end (end 20B) of cover 20. Diameter D2 may, if desired, be smaller than D1. In other arrangements, opening 64 in cover 20 may have diameter D2 (e.g., a smaller diameter than D1) at both ends of cover 20 and may have diameter D1 along a middle portion of length L between ends 20A and 20B. These examples are merely illustrative, however. In general, opening 64 in cover 20 may have any suitable diameter or combination of diameters along length L of cover 20.

If desired, fabric cover 20 may be pliable and stretchable such that D1 and/or D2 can expand or shrink. For example, cover 20 may have one set of diameters when cover 20 is in a relaxed state (e.g., neither stretched nor compressed) and a different set of diameters when cover 20 is stretched or compressed. In one illustrative arrangement, the diameter D2 at end portion 20B of cover 20 may be smaller than the diameter D3 of device 10 when cover 20 is in a relaxed state. As device 10 is inserted into opening 64, D2 may expand (e.g., may expand to be equal to or greater than D3) to accommodate device 10 in opening 64. Once fully inserted, end portion 20B of cover 20 may extend beyond device 10 and may therefore return to a relaxed state in which diameter D2 is smaller than D3 (e.g., so that cover 20 hooks over surface 66 of device 10), or end portion 20B of cover 20 may meet flush with surface 66 of device 10 and may therefore remain in a stretched state in which the diameter D2 of opening 64 is equal to or greater than diameter D3 of device 10.

In an illustrative arrangement, which is sometimes described herein as an example, device 10 may be a speaker (e.g., a portable speaker) and fabric 20 may be a removable fabric case or cover for the speaker. With this type of arrangement, device 10 may include one or more speaker grills such as speaker grill 68. Speaker grill 68 may cover all or some of the exterior surfaces of device 10. Speaker grill 68 may cover one or more speaker drivers (e.g., speaker drivers that each drive an associated diaphragm) in device 10.

As shown in FIG. 3, fabric 20 may include one or more openings such as openings 14. Openings 14 may provide fabric 20 with a desired aesthetic, may provide fabric 20 with breathability, and/or may provide fabric 20 with pathways through which signals such as audio signals, optical signals, and/or other signals may pass (e.g., to or from device 10). For example, components such as speakers, light-emitting components, or other components in device 10 may transmit signals through openings 14 in fabric 20.

Figure 4:
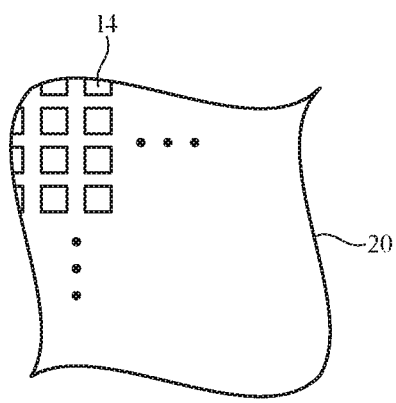
FIG. 4 is a top view of illustrative fabric having rectangular openings in accordance with an embodiment.
Figure 5:
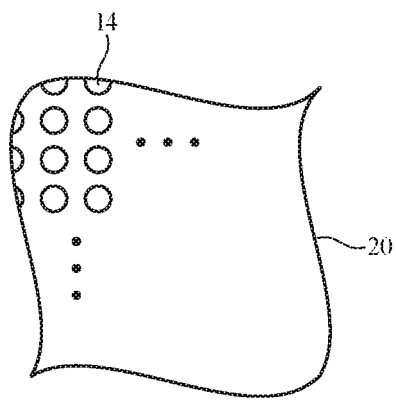
FIG. 5 is a top view of illustrative fabric having round openings in accordance with an embodiment.
Figure 6:
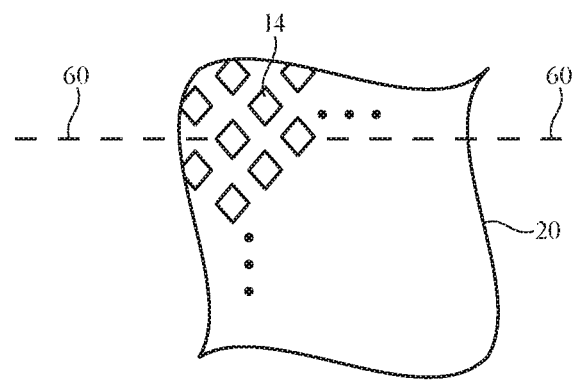
FIG. 6 is a top view of illustrative fabric having diamond-shaped openings in accordance with an embodiment.

Openings 14 may be relatively large openings (e.g., each spanning a distance of 10 mm, 50 mm, or more than 50 mm) or openings 14 may be relatively small openings (e.g., each spanning a distance of less than 10 mm). If desired, openings 14 may be rectangular as shown in FIG. 4, may be circular as shown in FIG. 5, may have a diamond shape as shown in FIG. 6, or may have any other suitable shape (e.g., an oval shape, a spiral shape, a triangular shape, an annular shape, etc.). In general, openings 14 may have any suitable size, shape, and spacing.

Figure 7:
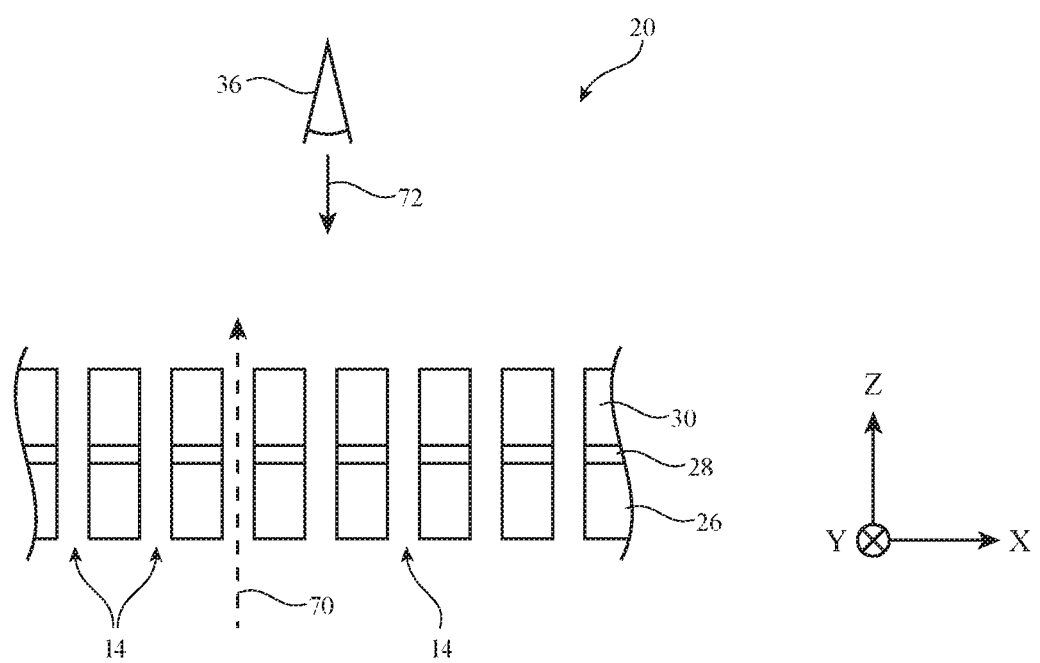
FIG. 7 is a cross-sectional side view of the fabric of FIG. 6 showing how a fabric cover may be a multi-layer fabric with openings in accordance with an embodiment.

If desired, fabric cover 20 may be formed from multiple layers to achieve a desired look, feel, and functionality. FIG. 7 is a cross-sectional side view of fabric cover 20 taken along line 60 of FIG. 6. As shown in FIG. 7, fabric 20 may have multiple layers such as layer 26, layer 28, and layer 30. In one illustrative arrangement, which is sometimes described herein as an example, layer 26 may be a spacer fabric (e.g., having two or more fabric layers joined by a cushiony spacer layer), layer 30 may be a seamless tube fabric (e.g., a continuous loop of fabric), and layer 28 may be an adhesive layer that holds spacer fabric 26 and seamless fabric 30 together. The compressibility and permeability of spacer fabric 26 may provide cover 20 with a soft, cushiony feel while also protecting device 10 from damage (e.g., by absorbing mechanical stress during a drop event). Seamless fabric 30 may provide cover 20 with a seamless outer layer having a uniform appearance from any viewing angle. If desired, fabric 20 may include additional layers or may be formed without some of the layers in FIG. 7. The example of FIG. 7 is merely illustrative.

Adhesive 28 may be a stand-alone adhesive layer or may be an adhesive tape having one or more adhesive layers on a carrier substrate. For example, adhesive 28 may be a pressure sensitive adhesive (e.g., coated on one or both sides of a carrier substrate), a chemically activated adhesive (e.g., a two-part adhesive having a hardener and a resin), a thermally activated adhesive that is cured by raising the temperature of the adhesive above room temperature, a light-cured adhesive (e.g., an adhesive cured by application of ultraviolet (UV) light) such as UV epoxy, or other suitable adhesive. In one illustrative arrangement, which is sometimes described herein as an example, adhesive 28 may be a fusible layer (e.g., a sheet of fusible material or a fabric formed from intertwined strands of fusible material) formed from thermosetting polymer material (e.g., thermosetting polyester, polyurethane, polyimide, or other thermosetting resin), thermoplastic material (e.g., thermoplastic polyester, nylon or other suitable polyamide, thermoplastic polyurethane, etc.), or other fusible material that becomes soft when heated to an appropriate temperature (e.g., between 60° C. and 140° C., between 60° C. and 160° C., 80° C. and 100° C., less than 180° C., etc.).

As shown in FIG. 7, cover 20 may have openings 14 that pass through all of the layers in cover 20 (e.g., layers 26, 28, and 30). It may be desirable to ensure that the openings in layers 26, 28, and 30 are not only aligned with one another but that they all have the same cross-sectional dimensions (e.g., dimensions along the x and y axes of FIG. 7). This may ensure that signals (e.g., audio signals) passing from device 10 through openings 14 in cover 20 (e.g., in direction 70) are uninhibited by any one of layers 26, 28, and 30. It may also ensure that a user such as viewer 36 viewing cover 20 in direction 72 does not see any protruding portions of layers 26, 28, or 30 in openings 14. This is, however, merely illustrative. If desired, openings 14 may have different dimensions among layers 26, 28, and 30. Arrangements in which openings 14 have uniform cross-sectional dimensions in layers 26, 28, and 30 are sometimes described herein as an example.

Openings such as openings 14 of FIG. 7 may be formed by stamping (punching), cutting, machining, plasma cutting, waterjet cutting, heating, ablation, chemical removal (e.g., polymer dissolving techniques, metal etching techniques, etc.), laser-based techniques (sometimes referred to as laser hole formation or laser drilling), and/or other suitable material removal techniques. Openings 14 may also be formed during the process of fabricating some or all of layers 26, 28, and 30 (e.g., by molding openings 14 into layer 28 as layer 28 is formed during a plastic molding process, by printing layer 28 in a pattern that includes openings 14, by extruding layer 28 with openings 14, by intertwining strands of material so that openings 14 are formed as fabric layers 26 and 30 are constructed, or by using other fabrication techniques in which openings such as openings 14 are formed during fabrication of layers 26, 28, and 30, rather than by removing material from layers 26, 28, and 30 after the layers have been fabricated).

Figure 8:
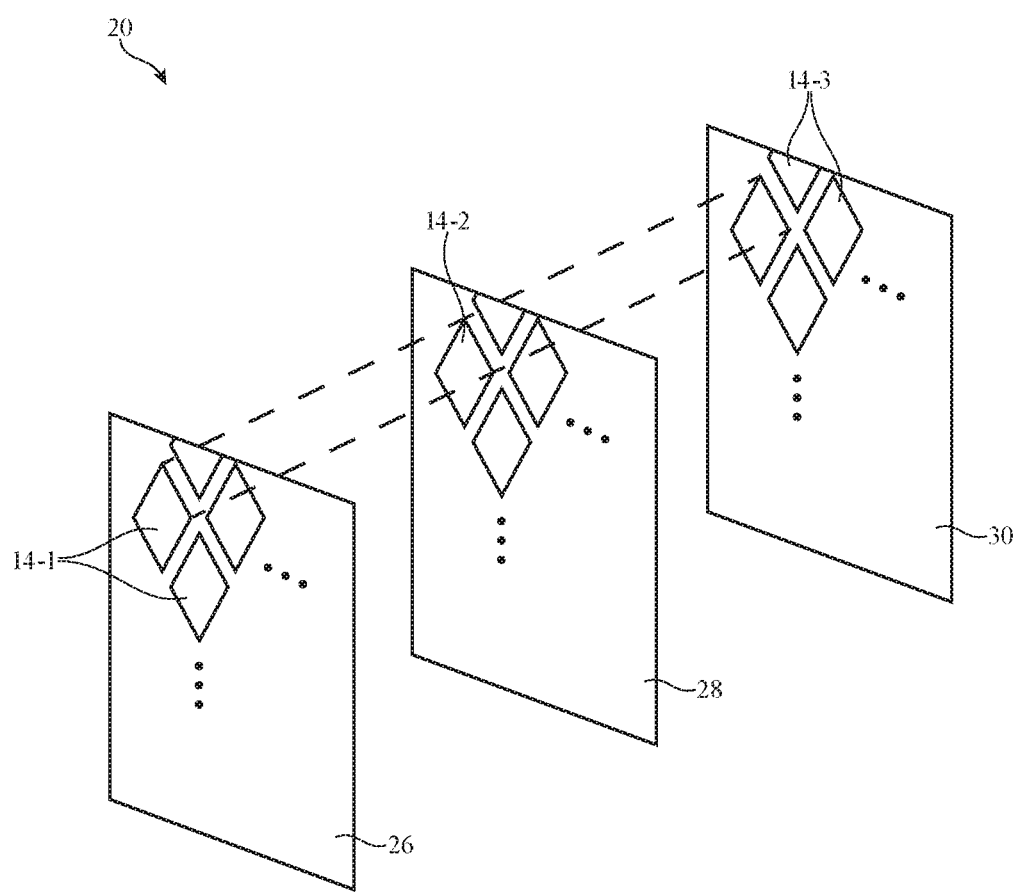
FIG. 8 is an exploded perspective view of the fabric of FIG. 7 showing how each layer in the fabric may have an array of openings that aligns with the arrays of openings in the other layers of the fabric in accordance with an embodiment.

Openings 14 in fabric 20 may be formed after layers 26, 28, and 30 have been attached to one another, or openings 14 may be formed in layers 26, 28, and 30 before the layers are attached to one another. As shown in FIG. 8, for example, layer 26 may have openings 14-1, layer 28 may have openings 14-2, and layer 30 may have openings 14-3. Openings 14-1 and 14-3 in fabric layers 26 and 30 may, for example, be formed as part of the fabric construction process or may be formed using a material removal technique described above. Openings 14-2 in adhesive 28 may be formed by printing, depositing, or molding layer 28 in a pattern that includes openings 14-2 or may be formed using a material removal technique described above. When attached, the edges of openings 14-1, 14-2, and 14-3 may align with one another to form openings 14 of FIG. 7.

Figure 9:
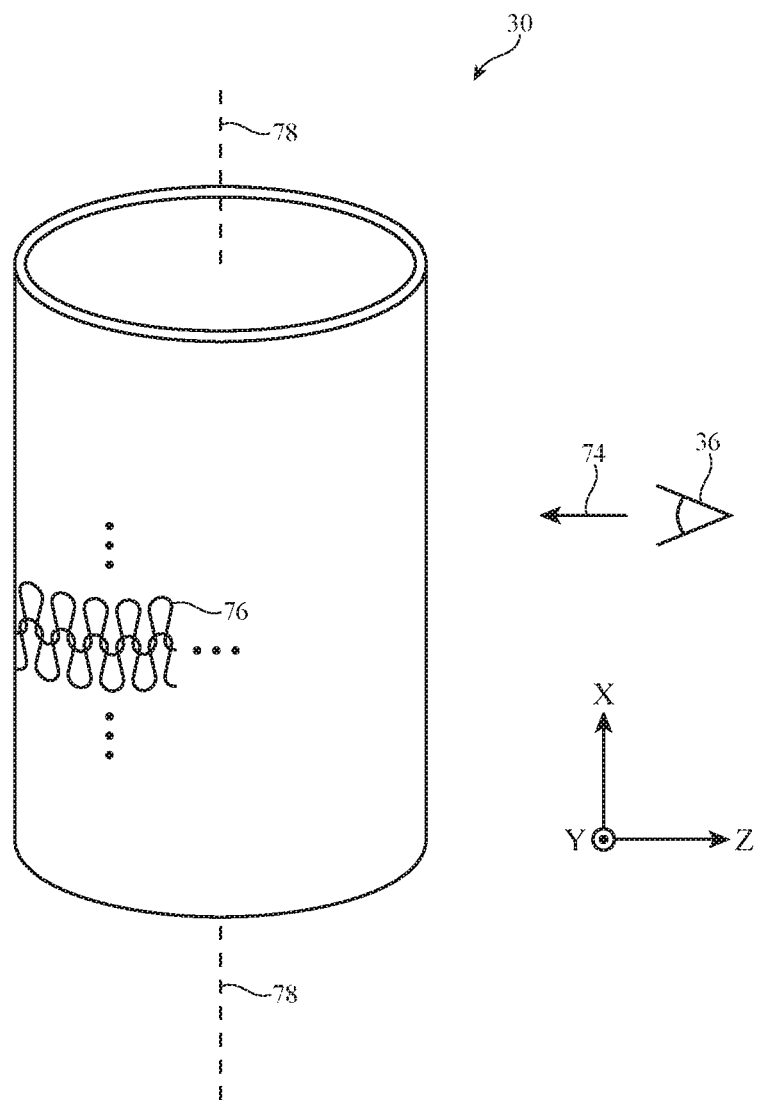
FIG. 9 is a perspective view of a seamless fabric tube that may be used in a fabric cover for an electronic device in accordance with an embodiment.

To provide cover 20 with a seamless outer layer having a uniform appearance from all viewing angles, seamless fabric 30 may form an outer layer of cover 20. A perspective view of an illustrative seamless fabric tube that may be used as an outer layer of cover 20 is shown in FIG. 9. Rather than being constructed as a flat layer with two edges that are later joined, fabric 30 may be constructed (e.g., knitted) in the form of a tube, in which strands 76 that make up fabric 30 extend continuously around longitudinal axis 78, with no edges or seams observable by a viewer such as viewer 36 viewing fabric 30 in direction 74.

While seamless tube fabrics such as fabric 30 of FIG. 9 may provide fabric cover 20 with a uniform outer appearance, it may be desirable to incorporate a spacer fabric in cover 20 to provide cover 20 with a soft, cushiony feel while also protecting device 10 from damage (e.g., by absorbing mechanical stress during a drop event). An illustrative spacer fabric of the type that may be used in cover 20 is shown in FIG. 10.

Figure 10:
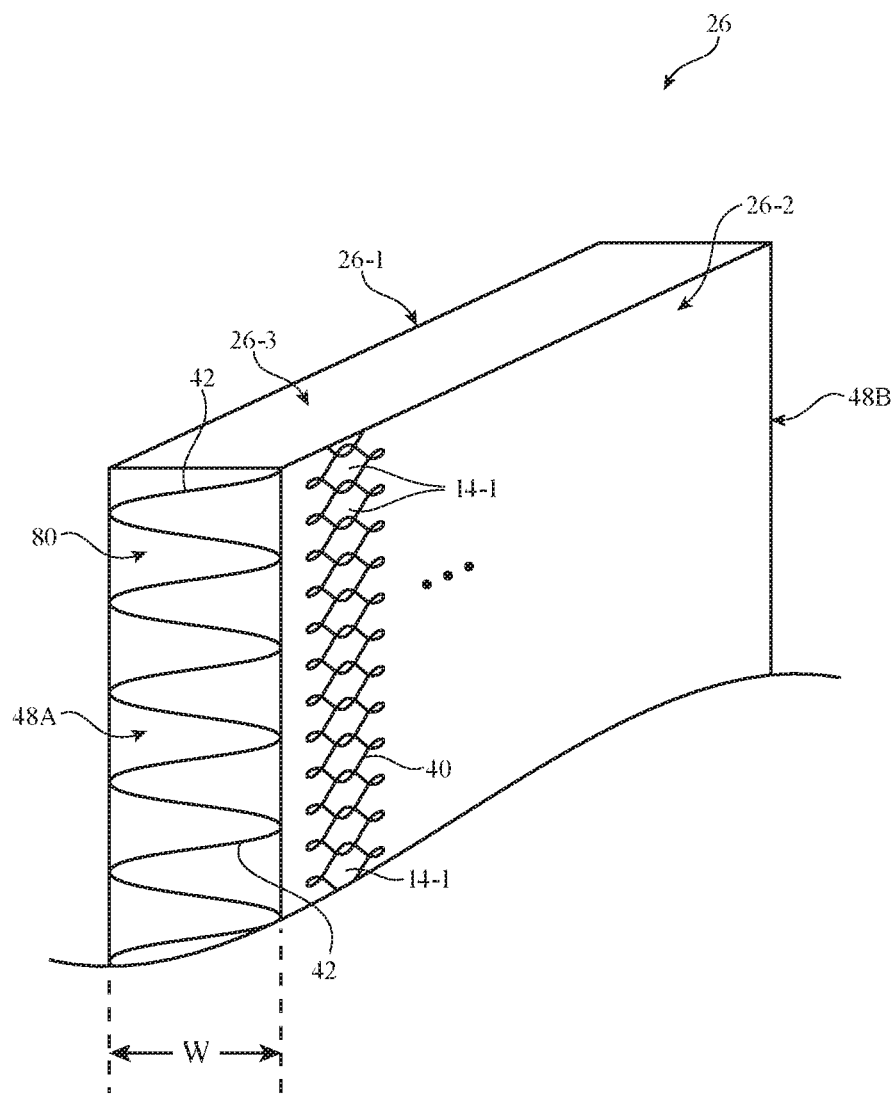
FIG. 10 is a perspective view of an illustrative spacer fabric that may be used in a fabric cover for an electronic device in accordance with an embodiment.

As shown in FIG. 10, spacer fabric 26 includes outer fabric layers 26-1 and 26-2 joined by spacer layer 26-3. Layers 26-1 and 26-2 may be warp knit or weft knit fabrics, each formed with its own set of intertwined strands 40. Layers 26-1 and 26-2 may have the same construction and material or may have different constructions and materials. Spacer layer 26-3 includes strands 42 that intertwine with strands 40 of layers 26-1 and 26-2 to join the two layers together. The width W between layers 26-1 and 26-2 may be between 1 mm and 15 mm, between 5 mm and 10 mm, between 20 mm and 30 mm, less than 1 mm, greater than 30 mm, or other suitable width. The air-filled space 80 between layers 26-1 and 26-2 gives fabric 26 a cushiony feel and allows fabric 20 to absorb mechanical stresses (and still be able to return to its original shape).

As shown in FIG. 10, spacer fabric 26 may be constructed with openings 14-1 (e.g., diamond shaped openings of the type shown in FIG. 6, or openings of any other suitable shape). This is, however, merely illustrative. If desired, openings 14-1 may be formed in fabric 26 by removing material from fabric 26 after fabric 26 has been constructed.

Figure 11:
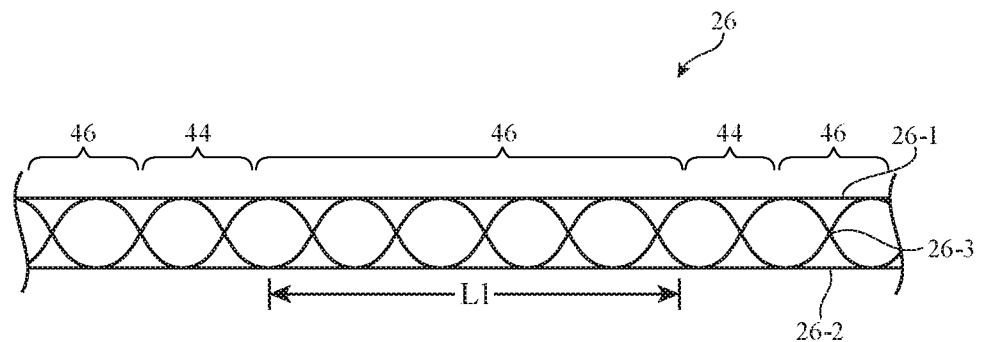
FIGS. 11, 12, and 13 show illustrative steps involved in forming a loop of spacer fabric with a uniform, uninterrupted pattern of openings in accordance with an embodiment.
Figure 12:
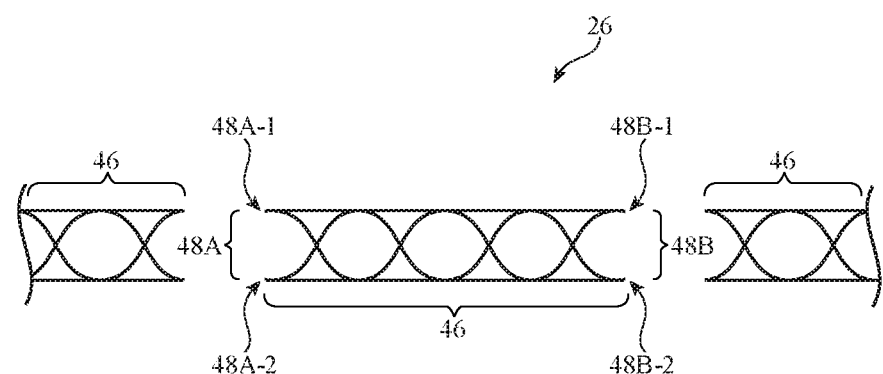
Figure 13:
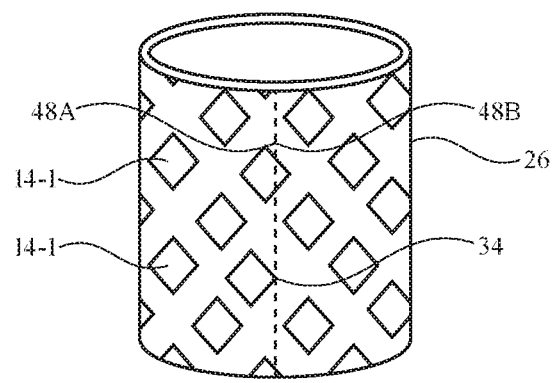

Spacer fabric 26 may have opposing edges 48A and 48B that are joined to produce a continuous loop of spacer fabric (e.g., for forming a cover having a cylindrical shape as shown in the example of FIG. 3). It may be desirable to ensure that the pattern of openings 14-1 in spacer fabric 26 are uninterrupted by the interface where edge 48A joints edge 48B. FIGS. 11, 12, and 13 show illustrative steps involved in forming edges 48A and 48B of spacer fabric 26 to ensure that the pattern of openings 14-1 at edge 48A matches up with the pattern of openings 14-1 at edge 48B.

As shown in FIG. 11, spacer fabric 26 may initially be longer than the required length L1 for forming cover 20 of FIG. 3. Regions 46 correspond to the regions of spacer fabric 26 that will eventually be used in forming cover 20. Regions 44 correspond to the regions of fabric 26 that will be removed to produce edges 48A and 48B of FIG. 10. In regions 44, the strands in some or all of the layers of fabric 26 (e.g., strands 40 in layers 26-1 and 26-2 and/or strands 42 in spacer layer 42 of FIG. 10) may be formed from a soluble material such as polyvinyl alcohol, other soluble polymers, or other materials that are soluble or dissolvable in water or other solvent. In regions 46, the strands of fabric 26 may be formed from a different material that does not dissolve in the solvent that dissolves the strands in regions 44. Fabric 26 of FIG. 11 may be soaked in the solvent (e.g., water or other solvent, depending on the material that forms the strands in regions 44) to dissolve the strands in regions 44, thereby producing fabric 26 of FIG. 12, in which portions 44 have been removed and portions 46 of fabric 26 remain intact.

As shown in FIG. 12, fabric 26 may be left with opposing edges 48A and 48B after the strands in region 44 are dissolved. Because edges 48A and 48B were not produced by cutting or otherwise severing fabric 26, edges 48A and 48B may be clean edges that do not disrupt the pattern of openings 14-1 in fabric 26. Following removal of the soluble strands in region 44, edge 48A-1 may be joined with edge 48B-1 of layer 26-1 and edge 48A-2 may be joined with edge 48B-2 of layer 26-2 to produce a continuous loop of spacer fabric 26 as shown in FIG. 13.

As shown in FIG. 13, edge 48A of fabric 26 meets and is joined with edge 48B of fabric 26 at interface 34 (sometimes referred to as a seam, joint, fused region, seam region, etc.). The array of openings 14-1 in fabric 26 may span across interface 34, without any disruption or non-uniformity in the size, shape, spacing, or appearance of openings 14-1. In other words, the pattern of openings along edge 48A of fabric 26 aligns with the pattern of openings along edge 48B of fabric 26 so that the resulting pattern of openings 14 across interface 34 appears as if there were no interface 34 (e.g., interface 34 may be unperceivable after edge 48A is joined with edge 48B). Edges 48A and 48B may be joined by fusing (e.g., heating fusible material in spacer fabric 26 to its melting/softening temperature), stitching, gluing with adhesive, ultrasonic welding, or other suitable attachment methods.

The example of FIGS. 11-13 in which edges 48A and 48B are formed by dissolving strands adjacent to edges 48A and 48B is merely illustrative. If desired, edges 48A and 48B may be formed by stamping (punching), cutting, machining, plasma cutting, waterjet cutting, heating, ablation, chemical removal (e.g., polymer dissolving techniques, metal etching techniques, etc.), laser-based techniques, and/or other suitable material removal techniques. In other arrangements, edges 48A and 48B may be produced as part of the process of forming fabric 26.

Figure 14:
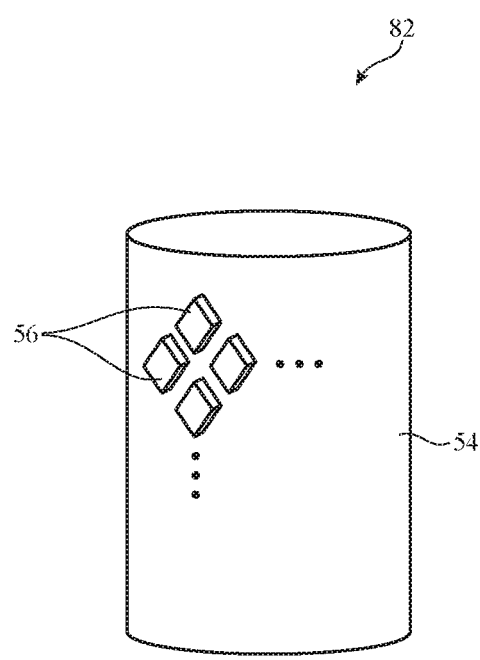
FIG. 14 is a perspective view of illustrative equipment that may be used to form a fabric cover for an electronic device in accordance with an embodiment.

Illustrative equipment that may be used to bond spacer fabric 26, adhesive 28, and seamless fabric 30 together is shown in FIG. 14. Equipment 82 of FIG. 14 may include a heated core 54 (e.g., a core having an adjustable temperature) with an array of protrusions 56. Protrusions 56 may have a size, shape, and spacing that matches the size, shape, and spacing of openings 14 in fabric 20 (e.g., protrusions 56 may be an array of diamond-shaped protrusions that match the size, shape, and spacing of openings 14-1 in layer 26, openings 14-2 in layer 28, and openings 14-3 in layer 30).

Figure 15:
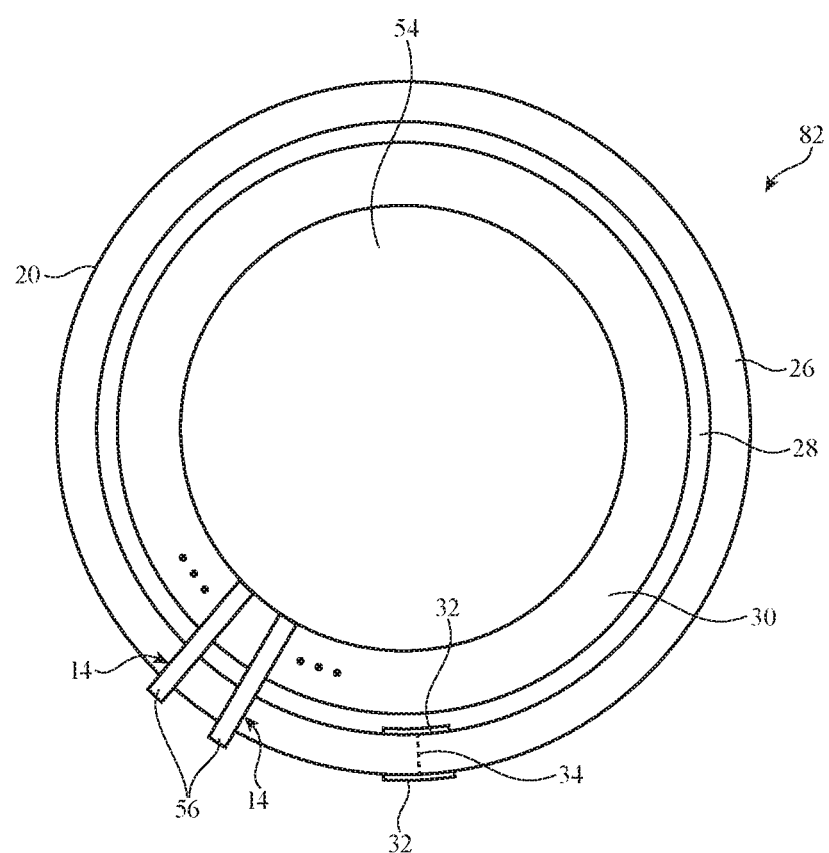
FIG. 15 is a top view of an illustrative system being used to form a fabric cover for an electronic device in accordance with an embodiment.

FIG. 15 shows how layers 26, 28, and 30 may be placed on equipment 82. In the example of FIG. 15, the layers of fabric cover 20 are placed on equipment 82 in the opposite order that the layers have in the final fabric cover 20 (e.g., cover 20 of FIGS. 17 and 18). Once bonded together using equipment 82, the layers may be removed from equipment 82 and inverted. This is, however, merely illustrative. If desired, the layers of fabric cover 20 may be placed on equipment 82 in the order that the layers have in the final fabric cover 20, or the layers of fabric 20 may be left in the order shown in FIG. 15 without being inverted.

Seamless fabric layer 30 (e.g., seamless fabric tube 30 of FIG. 9) may be placed on heated core 54 (e.g., by threading protrusions 56 through openings 14-3 in seamless fabric layer 30). Adhesive layer 28 may be placed on heated core 54 over seamless fabric layer 30 (e.g., by threading protrusions 56 through openings 14-2 in adhesive layer 28). Spacer fabric 26 may be placed on heated core 54 over adhesive layer 28 (e.g., by threading protrusions 56 through openings 14-1 in spacer fabric 26).

If desired, one or more seam hiding layers such as seam hiding strips 32 may be placed on opposing sides of spacer fabric 26 over interface 34 (where edges 48A and 48B of spacer fabric 26 meet as shown in FIG. 13) to help obscure interface 34 from view by a user. For example, a first seam hiding strip 32 may be placed between adhesive 28 and spacer fabric 26, and a second seam hiding strip 32 may be placed on the opposing side of spacer fabric 26 (e.g., so that interface 34 is sandwiched between seam hiding layers 32). Seam hiding strips 32 may only cover interface 34 rather than extending all the way around the perimeter of fabric cover 20, as shown in the example of FIG. 15, or layer 32 may form a continuous loop that extends around the perimeter of fabric cover 20. Each seam hiding strip 32 may have an array of openings (e.g., openings 14-4 of FIG. 16) that aligns with the array of openings 14-1, 14-2, and 14-3 in layers 26, 28, and 30, respectively. Openings 14-4 in seam hiding strip 32 may be formed using any of the hole formation techniques described in connection with openings 14 of FIG. 7.

Seam hiding strips 32 may each include one or more layers of material. For example, seam hiding strips 32 may include one or more fabric layers (e.g., intertwined strands of material) and one or more adhesive layers. The adhesive layer may, if desired, be pre-laminated to the fabric layer before being bonded to the remaining layers in fabric 20 on equipment 82.

This is, however, merely illustrative. If desired, there may be greater or fewer than two seam hiding layers 32 in fabric cover 20, or seam hiding layers 32 may not be included in fabric cover 20.

Equipment 82 may be used to raise the temperature of fabric 20 and thereby bond the layers together. For example, core 54 may be heated to raise the temperature of adhesive layer 28 and thereby bond seamless fabric 30 to spacer fabric 26. Heat from core 54 may also be used to fuse edges 48A and 48B of spacer fabric 26 together at interface 32 and to bond seam hiding layers 32 to opposing sides of spacer fabric 26. If desired, heat may be applied after all of the layers shown in FIG. 15 have been placed on core 54, or heat may be applied in multiple steps to heat individual layers before all of the layers of fabric 20 have been placed on core 54.

Figure 16:
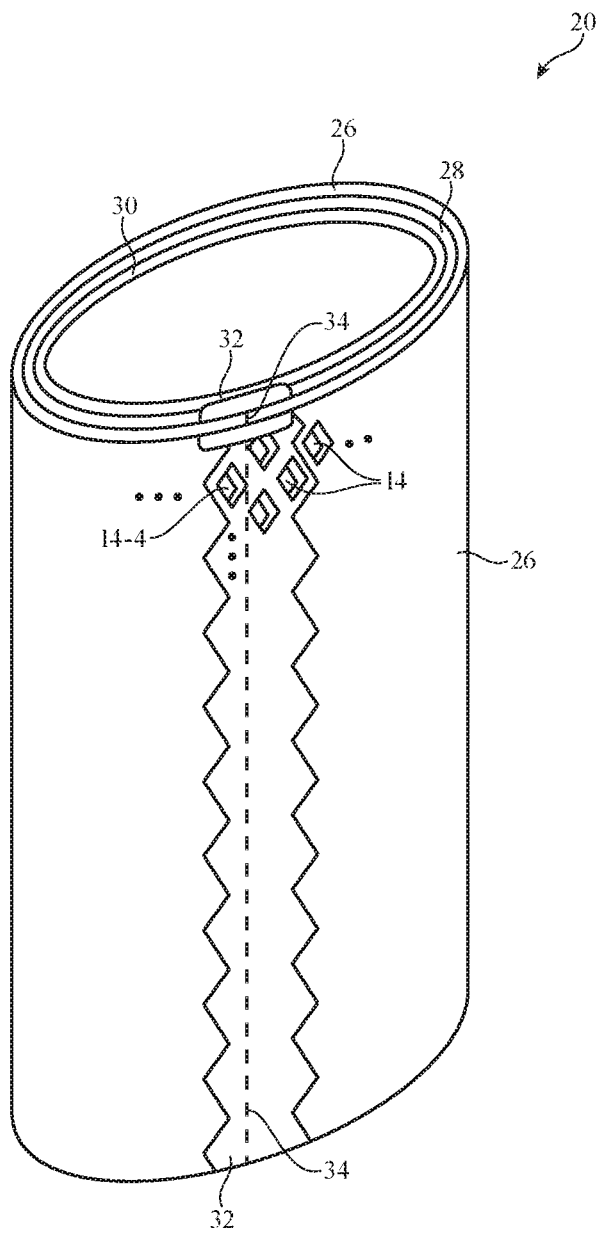
FIG. 16 is a perspective view of an illustrative fabric cover for an electronic device after being processed using the system of FIG. 15 in accordance with an embodiment.

FIG. 16 is a perspective view of fabric 20 after being processed using equipment 82 of FIG. 15. When fabric cover 20 is initially removed from core 54, seamless fabric 30 is located on the interior of cover 20 and spacer fabric 26 is located on the exterior of cover 20, with seam hiding layers 32 overlapping interface 34 where edges 48A and 48B of spacer fabric 26 have been joined. The openings in each individual layer of fabric cover 20 (e.g., openings 14-1 in spacer fabric 26, openings 14-2 in adhesive 28, openings 14-3 in seamless fabric 30, and openings 14-4 in seam hiding layers 32) all align with one another, producing a pattern of openings 14 in fabric cover 20 that wraps uniformly around the perimeter of cover 20. After the layers of fabric cover 20 have been bonded together, fabric cover 20 may be inverted to produce the fabric cover 20 of FIG. 17.

Figure 17:
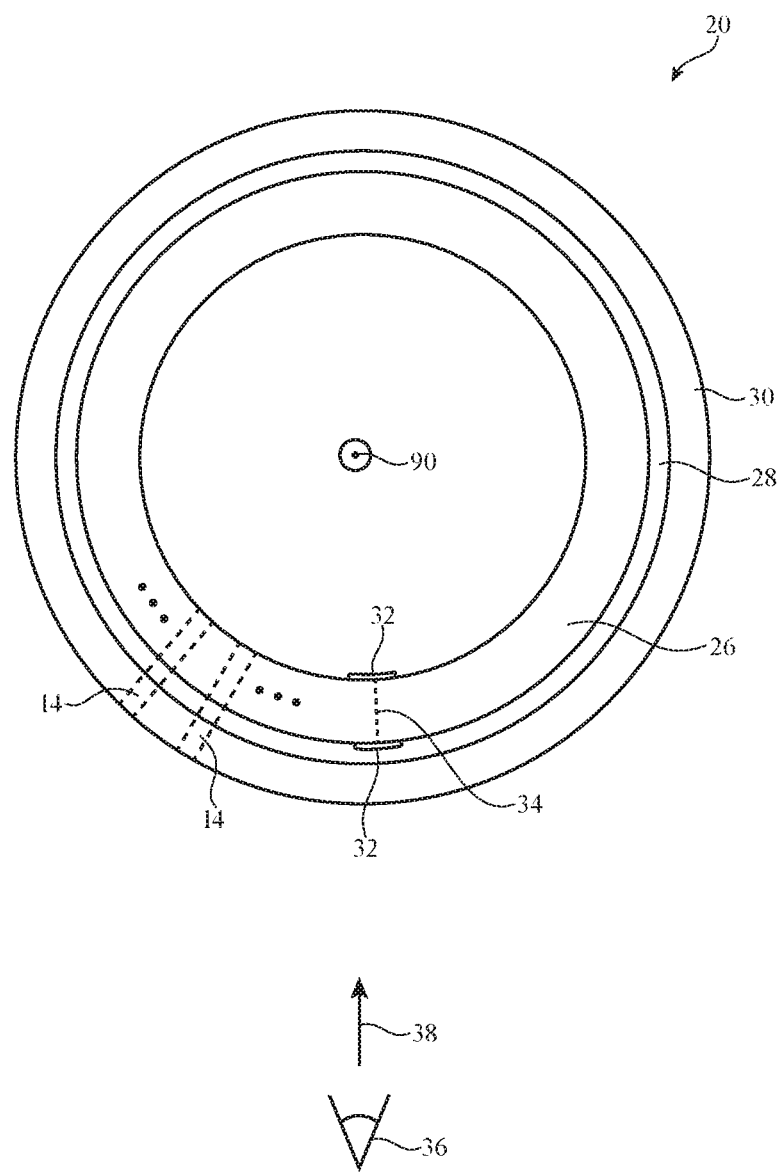
FIG. 17 is a top view of the fabric cover of FIG. 16 after being inverted to produce a seamless outer layer in accordance with an embodiment.

As shown in FIG. 17, seamless fabric layer 30 forms an exterior layer of fabric cover 20, whereas spacer fabric 26 forms an interior layer of fabric cover 20. Interface 34 where edges of spacer fabric 26 have been joined is hidden from viewer 36 viewing cover 20 in direction 38 by outer seamless layer 30 and by seam hiding layers 32. The combination of spacer fabric 26 and seamless layer 30 provides fabric cover 20 with the cushion and protection of a spacer fabric and the seamless, uniform appearance of a seamless fabric. The pattern of openings 14 in fabric cover 20 may wrap continuously and uniformly around longitudinal axis 90 without any disruptions or non-uniformities in size, spacing, or shape of openings 14.

Figure 18:
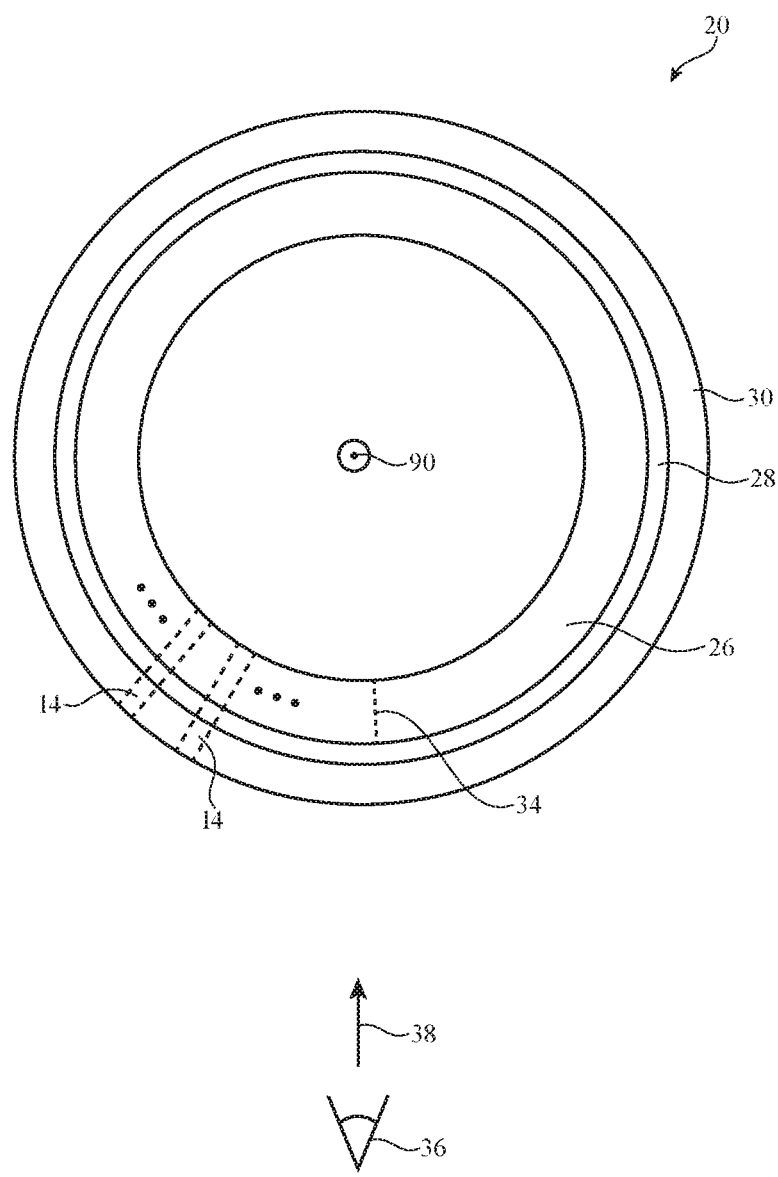
FIG. 18 is a top view of an illustrative fabric cover formed from seamless spacer fabric in accordance with an embodiment.

FIG. 18 shows an example in which fabric cover 20 does not include seam hiding layers 32. Interface 34 where edges of spacer fabric 26 have been joined is hidden from viewer 36 viewing cover 20 in direction 38 by outer seamless layer 30. The combination of spacer fabric 26 and seamless layer 30 provides fabric cover 20 with the cushion and protection of a spacer fabric and the seamless, uniform appearance of a seamless fabric. The pattern of openings 14 in fabric cover 20 may wrap continuously and uniformly around longitudinal axis 90 without any disruptions or non-uniformities in size, spacing, or shape of openings 14.

Following lamination of fabric cover 20, additional processing equipment may be used to form fabric cover 20 into the desired shape. The additional processing equipment may include a shaping tool that applies heat and/or pressure to shape cover 20 into the desired shape of the final product. As shown in FIG. 3, for example, one or both ends such as end 20A of cover 20 may have a smaller diameter D2 than the diameter D1 along the middle of cover 20. This may be achieved by placing cover 20 onto a shaping tool having a first portion with a first diameter (e.g., a diameter equal to D1) and a second portion with a second diameter (e.g., a diameter equal to D2). The part of fabric cover 20 that sits on the second portion of the shaping tool may be cinched inwards until it has the smaller diameter D2. Cutting equipment (e.g., a die cutting tool or other suitable equipment) may be used to remove portions of cover 20 that are not desired in the final product.

Care should be taken to ensure that the cinching process at the ends of cover 20 does not compromise the uniformity of openings 14. If some openings 14 at the top end of cover 20 are cinched in more than others, the top row of openings 14 would not appear uniform. For example, a non-uniform cinch might cut off some openings (e.g., leaving only a half-diamond opening at the top row of openings) whereas other openings might not be cut off (e.g., leaving a full diamond opening at the top row of openings).

If desired, one or more sacrificial drawstrings may be incorporated into cover 20 to achieve a uniformly cinched end. For example, prior to laminating spacer layer 26 to seamless layer 30, a drawstring (e.g., a strand or group of strands) may be inserted into spacer layer 26 at one or both ends of spacer layer 26. The drawstring may pass through a single row of openings 14-1 in layer 26. Following lamination of cover 20 (e.g., after layers 26 and 30 have been laminated with equipment 54), the drawstring may extend around the diameter of cover 20. If both ends of cover 20 are to be cinched inwards, two drawstrings may be incorporated into cover 20, with one at each end.

Following lamination of cover 20, cover 20 may be placed on a shaping tool having the desired shape of the final product. In arrangements where opposing ends cover 20 are to be cinched inwards, a drawstring may be located at each end of cover 20. The shaping tool may have opposing ends with a smaller diameter than a central portion of the shaping tool. The two drawstrings may be located on the portions of the shaping tool with the smaller diameter. As heat and pressure is applied to press cover 20 against the tool, the ends of cover 20 will collapse inwards. Because a drawstring passes through a row of openings 14 at each end of cover 20, the openings 14 in that row and the rows adjacent to it will be prevented from non-uniformly cinching inwards. This ensures that all of openings 14 in cover 20, even openings 14 at the cinched ends, extend uniformly around cover 20, without a change in shape, size, or location relative to the edge of cover 20. If desired, cover 20 may be trimmed or cut after being shaped to remove the portion of cover 20 with the sacrificial drawstring.

The foregoing is merely illustrative and various modifications can be made by those skilled in the art without departing from the scope and spirit of the described embodiments. The foregoing embodiments may be implemented individually or in any combination.

What is claimed is:

1. A cover for an electronic device, comprising:
a seamless fabric tube having opposing interior and exterior surfaces that surround a longitudinal axis;
a spacer fabric that lines the interior surface of the seamless fabric tube; and
an adhesive material interposed between the seamless fabric tube and the spacer fabric.

2. The cover defined in claim 1 wherein the spacer fabric has a first array of openings, the adhesive material has a second array of openings, the seamless fabric tube has a third array of openings, and wherein the first, second, and third arrays of openings are aligned with one another.

3. The cover defined in claim 2 wherein the openings in the first, second, and third arrays of openings comprise diamond-shaped openings.

4. The cover defined in claim 2 wherein the spacer fabric comprises first and second fabric layers joined by a spacer layer.

5. The cover defined in claim 2 wherein the spacer fabric has a fused region where a first portion of the spacer fabric has been fused to a second portion of the spacer fabric.

6. The cover defined in claim 5 further comprising:
an elongated strip of fabric interposed between the seamless fabric tube and the spacer fabric, wherein the elongated strip of fabric overlaps the fused region.

7. The cover defined in claim 6 further comprising a fourth array of openings in the elongated strip of fabric, wherein the fourth array of openings aligns with the first, second, and third arrays of openings.

8. The cover defined in claim 7 wherein the first, second, and third arrays of openings extend around the cover in a uniform pattern.

9. The cover defined in claim 1 wherein the seamless fabric tube, the spacer fabric, and the adhesive material surround a central opening having a length that extends parallel to the longitudinal axis, wherein the central opening has a first diameter at a first location along the length and a second diameter that is less than the first diameter at a second location along the length.

10. The cover defined in claim 9 wherein the cover has first and second opposing ends, wherein the length of the opening extends between the first and second ends, wherein the second location with the second diameter is at one of the first and second ends, and wherein the first location with the first diameter is between the first and second ends.

11. A fabric item, comprising:
a multi-layer spacer fabric that forms a loop around a longitudinal axis, wherein the multi-layer spacer fabric has a seam region where first and second portions of the multi-layer spacer fabric have been joined, and wherein the multi-layer spacer fabric comprises first openings;
a single-layer fabric that forms a seamless loop around the longitudinal axis, wherein the single-layer fabric comprises second openings that align with the first openings; and
an adhesive layer interposed between the multi-layer spacer fabric and the single-layer fabric, wherein the adhesive layer has third openings that align with the first and second openings.

12. The fabric item defined in claim 11 wherein the first, second, and third openings have a matching shape, size, and spacing.

13. The fabric item defined in claim 11 wherein the multi-layer spacer fabric comprises first and second fabric layers joined by a spacer layer.

14. The fabric item defined in claim 11 wherein the single-layer fabric surrounds the multi-layer spacer fabric.

15. The fabric item defined in claim 11 wherein the multi-layer spacer fabric comprises fusible material.

16. A removable fabric cover for an electronic device, comprising:
a first fabric layer that forms a seamless loop; and
a second fabric layer that forms a loop having a seam, wherein the second fabric layer lines an interior surface of the first fabric layer such that the first fabric layer covers the seam in the second fabric layer, wherein the second fabric layer has a pattern of openings that extends uniformly across the seam, and wherein the first fabric layer is bonded to the second fabric layer.

17. The removable fabric cover defined in claim 16, further comprising a thermoplastic material that bonds the first fabric layer to the second fabric layer.

18. The removable fabric cover defined in claim 17 wherein the thermoplastic material has a pattern of openings that aligns with the pattern of openings in the second fabric layer.

19. The removable fabric cover defined in claim 18 wherein the first fabric layer comprises a tube of single-layer knit fabric and the second fabric layer comprises a spacer fabric having first and second outer layers joined by a spacer layer.

20. The removable fabric cover defined in claim 19 wherein the first fabric layer has a pattern of openings that aligns with the pattern of openings in the second fabric layer.

* * * * *